United States Patent [19]
Knight

[11] 3,990,011
[45] Nov. 2, 1976

[54] METHOD AND APPARATUS FOR DETERMINING AM MODULATION FACTOR

[75] Inventor: Jerry K. Knight, Marion, Iowa

[73] Assignee: Rockwell International Corporation, El Segundo, Calif.

[22] Filed: Sept. 10, 1975

[21] Appl. No.: 612,141

[52] U.S. Cl. .............................. 325/133; 325/67; 332/39
[51] Int. Cl.² .................................. H04B 17/00
[58] Field of Search .............. 325/67, 31, 133, 363, 325/134; 324/77 R, 77 A; 332/38, 39

[56] References Cited
UNITED STATES PATENTS

| | | |
|---|---|---|
| 1,820,833 | 8/1931 | Ring .................................... 332/39 |
| 1,915,558 | 6/1933 | Terman ................................ 332/39 |
| 2,082,492 | 6/1937 | Grumel ................................ 332/39 |
| 2,119,194 | 5/1938 | Babler ................................. 332/39 |
| 2,362,830 | 11/1944 | Kline ................................... 332/39 |
| 2,548,635 | 4/1951 | Summerhayes, Jr. ................ 332/39 |
| 2,941,162 | 6/1960 | Cotellessa et al. .................. 332/39 |
| 2,962,673 | 11/1960 | Gerber ................................ 332/39 |
| 2,984,796 | 5/1961 | Affelder .............................. 332/39 |

*Primary Examiner*—Robert L. Griffin
*Assistant Examiner*—Jin F. Ng
*Attorney, Agent, or Firm*—Howard R. Greenberg; Robert J. Crawford

[57] ABSTRACT

The modulation factor for an AM signal wherein the modulation signal is an A. C. wave is determined by demodulating the AM signal, obtaining the average D. C. level and peak deviation therefrom for the demodulated signal and then dividing the latter by the former.

5 Claims, 4 Drawing Figures

METHOD AND APPARATUS FOR DETERMINING AM MODULATION FACTOR

BACKGROUND OF THE INVENTION

The subject invention pertains generally to AM modulation and specifically to a method and apparatus for determining the modulation factor for an AM signal wherein the modulation signal is an A. C. wave.

The amount of AM modulation imparted to an A. C. carrier is reflected by the AM modulation factor, viz. the ratio of incremental change in peak amplitude imparted to the A. C. carrier by virtue of the modulation signal to the unmodulated A. C. carrier peak amplitude. In order to avoid distortions produced by exceeding 100% AM modulation, prior to radio transmissions the AM modulation factor is normally set by the operator on an indicting meter to some predetermined level (usually 90%) by varying the output level of the audio compressor in the radio transmitter while modulating the A. C. carrier with a sinusoidal signal. Since the indicating meter which reads the modulation factor is designed to be accurate for only one level of transmitted RF power corresponding to a predetermined A. C. carrier amplitude, any deviation in transmitted RF power therefrom inherently results in an erroneous reading which can become quite significant with increasing power deviations. Although some radio transmitters are equipped with special circuitry for maintaining a constant level of transmitted RF power irrespective of carrier frequency which obviates the foregoing problem, many common transmitters do not. These latter transmitters may have substantial RF power variations over their operating carrier frequency ranges (in some cases the highest power level being twice that of the lowest power level) which necessitates that the operator apply a correction factor obtained from a chart to the modulation factor meter reading which varies with the meter reading in order to obtain a reliable indication of percent modulation. This, of course, is a nuisance and imposes a burden on the operator.

With the foregoing in mind, it is a primary object of the present invention to provide a new and improved method and apparatus for determining the modulation factor for an AM signal wherein the modulation signal is an A. C. wave.

It is a further object of the present invention to provide such a new and improved method and apparatus for determining the AM modulation factor which is accurate irrespective of the A. C. carrier level.

It is still a further object of the present invention to provide such a new and improved method for determining the AM modulation factor which may be implemented through apparatus having a simple and inexpensive design so as to be readily competitive with prior art indicators which are accurate for only one R. F. power level and therefore require correction by the operator at other power levels.

These objects as well as others and the means by which they are achieved through the present invention may best be appreciated by referring to the Detailed Description of the Preferred Embodiment which follows hereinafter together with the appended drawings.

BRIEF DESCRIPTION OF THE PREFERRED EMBODIMENT

In accordance with the foregoing stated objects, the present invention determines the modulation factor for an AM signal wherein the modulation signal is an A. C. wave by demodulating the AM signal, developing two signals therefrom, one being proportional to the average D. C. level and the other proportional to the peak deviation from the average D. C. level for the demodulated AM signal and then dividing the latter by the former. All of the steps are performed with readily available commercial circuitry. The last step in the preferred embodiment is performed by applying the peak deviation signal to a voltage divider circuit having a variable resistor whose output voltage is linearly proportional to the modulation factor and whose resistance is inversely proportional to the average D. C. level signal.

DETAILED DESCRIPTION OF THE INVENTION

Figure 1:
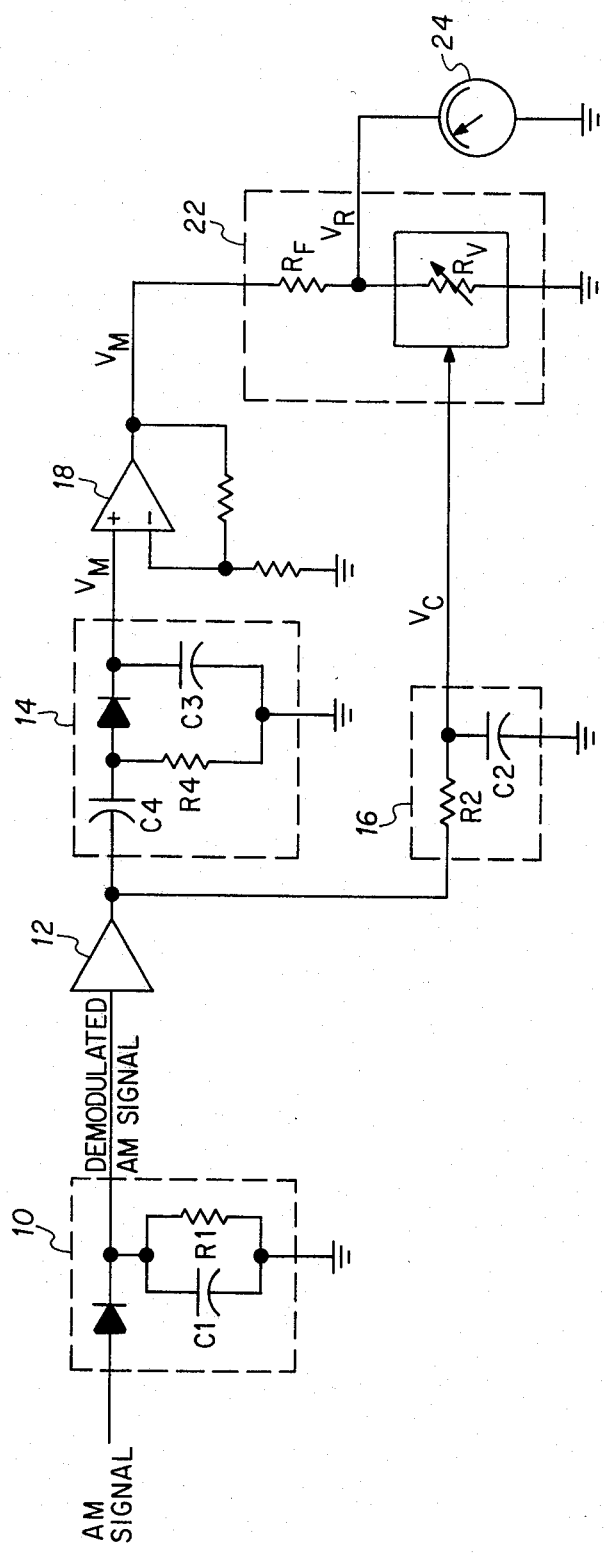
FIG. 1 is a schematic diagram depicting the preferred embodiment of the invention.
Figure 2:
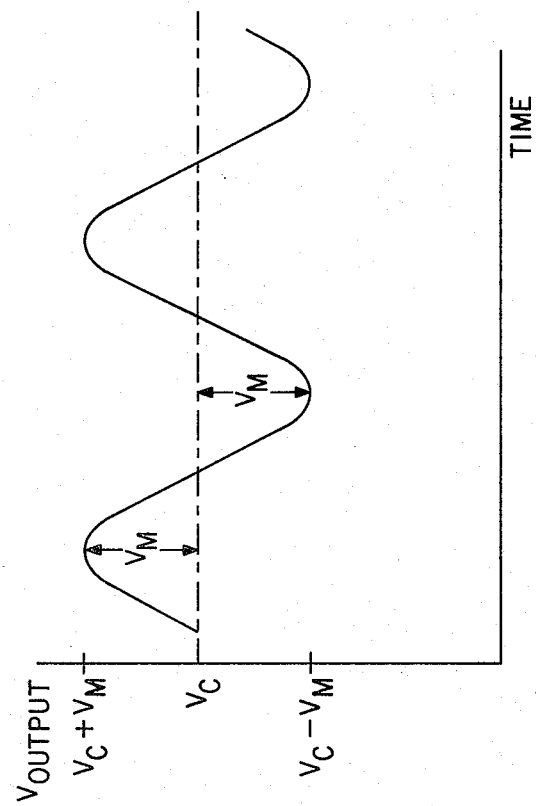
FIG. 2 presents a typical waveform for the type of demodulated AM signal to which the invention is applicable.

As shown in FIG. 1, an AM signal (which is referenced to ground, as it will be assumed are all signals herein) is applied to an AM demodulator such as conventional diode detector 10 which produces at its output across capacitor $C_1$ and resistor $R_1$ the demodulated AM signal. Although the invention is applicable to any AM signal wherein the modulation signal is an A. C. wave, it will be assumed for illustrative purposes only that the modulation signal is sinusoidal, so that the demodulated AM output appears as the positive modulation envelope waveform shown in FIG. 2 wherein $V_C$ is the unmodulated A. C. carrier peak amplitude and $V_M$ is the incremental change in peak amplitude imparted to the unmodulated A. C. carrier peak amplitude by virtue of the modulating sinusoid. As adverted to earlier, the modulation factor in terms of percentage is equal to:

$$\frac{V_M}{V_C} \times 100.$$

After raising the demodulated AM signal to a higher operable level suitable for processing by passing it through linear amplifier 12 (the gain will be assumed equal to one herein only for expediency), it is applied to two different circuits, namely, peak detector circuit 14 and averaging circuit 16. As will be appreciated by those skilled in the art, by selecting suitable values for resistor $R_2$ and capacitor $C_2$ which comprise averaging circuit 16, the output across loaded capacitor $C_2$ may be made equal to the average D. C. level of the demodulated AM signal applied to circuit 16 which of course is $V_C$. By placing across capacitor $C_3$ of peak detector 14 a large load such as that provided by operational amplifier 18 (which it will be assumed also has unity gain for the sake of simplicity) and applying the demodulated AM signal thereto via D. C. blocking capacitor $C_4$, load resistor $R_4$ and half-wave rectifying diode 20, a signal is produced thereacross equal to the peak value of the demodulated AM signal above its average D. C. level, which of course is $V_M$ and which is reproduced at the output of amplifier 18.

Figure 3:
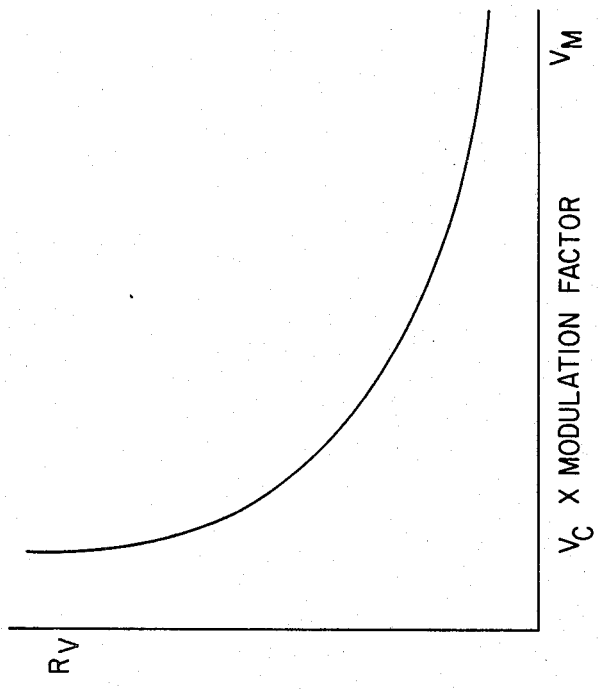
FIG. 3 is a graph interrelating two of the essential parameters in order to properly realize the ratio for the AM modulation factor through the voltage divider circuit disclosed in the preferred embodiment.

Having developed the two signals, namely, $V_M$ and $V_C$, for determining the modulation factor, it is only necessary now to obtain their ratio which is performed by division circuit 22 comprising a fixed resistor $R_F$ and a variable resistor $R_V$. Considering the resistance of a meter 24 connected across the output of resistor $R_V$ to be equal to $R_M$, then by applying voltage division and solving for $R_V$, it will be seen that:

$$R_V = \frac{R_F \times V_R}{V_M - V_R}(1 + R_F/R_M)$$

where $V_R$ is the voltage developed across resistor $R_V$ for a given voltage $V_M$. For any constant value of $V_R$, the resistance of resistor $R_V$ will vary inversely proportional to $V_M$ as shown in FIG. 3. Since $V_M$ is equal to $V_C$ X Modulation Factor, the abscissa of the graph in FIG. 3 can be relabeled $V_C$ X Modulation Factor. And, if the voltage $V_C$ is allowed to vary as $V_M$ so as to control the resistance of $R_V$ while maintaining the modulation factor a constant, corresponding to the fixed voltage $V_R$ in determining the curve of FIG. 3, then the voltage $V_R$ appearing across resistor $R_V$ will in fact be a linear function of the voltage $V_M$ and consequently the modulation factor $V_M/V_C$. This follows since voltage division is a linear process and $V_R$ must follow $V_M$ for any given value of $V_C$. Accordingly, for a particular value of $V_C$ and a modulation factor equivalent to that for which the curve of FIG. 3 was determined the division circuit 22 will produce the voltage of $V_R$ which was held constant in determining the curve in the first place. With that same value of $V_C$, but a different modulation factor, $V_R$ will increase or decrease in conjunction with $V_M$ to reflect the change of modulation factor. When the voltage $V_R$ is applied to meter 24, the linearly proportional current deflects the needle of the meter in a linear fashion so as to provide a visual indication of the modulation factor on the meter which can be calibrated accordingly. And this is so irrespective of the RF power as measured by $V_C$.

Figure 4:
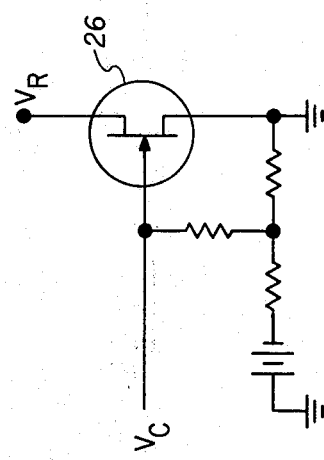
FIG. 4 shows one physical implementation for achieving the variable resistor of the voltage divider circuit in the preferred embodiment.

It will be appreciated by those skilled in the art that the curve of FIG. 3 has the same shape as the resistance curve for a field effect (FET) transistor which is operated as a voltage controlled resistor where $R_V$ is the resistance produced across the source-drain junction of the FET and $V_C$ is the voltage applied to its gate terminal. Consequently, the variable resistance of $R_V$ can be realized through a suitable FET such as the properly biased FET 26 shown in FIG. 4. Once having determined the voltage and resistance parameters to be used in the circuit, a FET having the requisite characteristics can be selected from the multitude of commercially available ones to most closely match the desired curve of FIG. 3.

As the foregoing demonstrates, the invention provides a simple and inexpensive, albeit effective, means employing readily available commercial circuitry for determining the modulation factor for an AM signal wherein the modulation signal is an A. C. wave. Unlike prior art indicators which provide accurate readings only when the A. C. carrier level is held constant or which require that the operator intervene to manually correct the meter readings for different carrier levels, the invention herein automatically provides an accurate reading of modulation factor irrespective of A. C. carrier level. Since modifications to the preferred embodiment may be made by those skilled in the art which would not necessarily constitute departures from the scope and spirit of the invention, the foregoing detailed description is intended to be merely exemplary and not circumscriptive of the invention as claimed hereinbelow.

What is claimed is:
1. Apparatus for determining the modulation factor for an AM signal wherein the modulation signal is an A.C. wave, comprising:
   detector means for demodulating the AM signal;
   averaging means for providing a first signal proportional to the average D.C. level of the demodulated AM signal;
   peak detector means for providing a second signal proportional to the peak deviation of the demodulated AM signal from its average D.C. level, and
   division means for providing a third signal proportional to the ratio of said second signal to said first signal wherein said division means is a divider circuit for receiving said second signal that has a variable resistor across which said third signal is developed and whose resistance is inversely proportional to said first signal.
2. The apparatus of claim 1 wherein said variable resistor is provided by the source-drain junction of a field effect transistor.
3. The apparatus of claim 1 including indicating means for providing a visual indication of said third signal.
4. A method of determining the modulation factor for an AM signal wherein the modulation signal is an A.C. wave, comprising:
   demodulating the AM signal;
   averaging the demodulated AM signal;
   determining the peak deviation of the demodulated AM signal from its average D.C. level, and
   dividing the average value of the demodulated AM signal into its determined peak deviation wherein said dividing is accomplished by applying said determined peak deviation to a divider circuit having a variable resistor and varying the resistance of said resistor inversely proportional to said average value.
5. The method of claim 4 including visually displaying the ratio of average value to peak deviation for the demodulated AM signal obtained by said dividing.

* * * * *